Oct. 27, 1964 C. G. SHOOK 3,154,767
STORAGE WIRE ERASE
Filed Feb. 8, 1960
FIG. 1
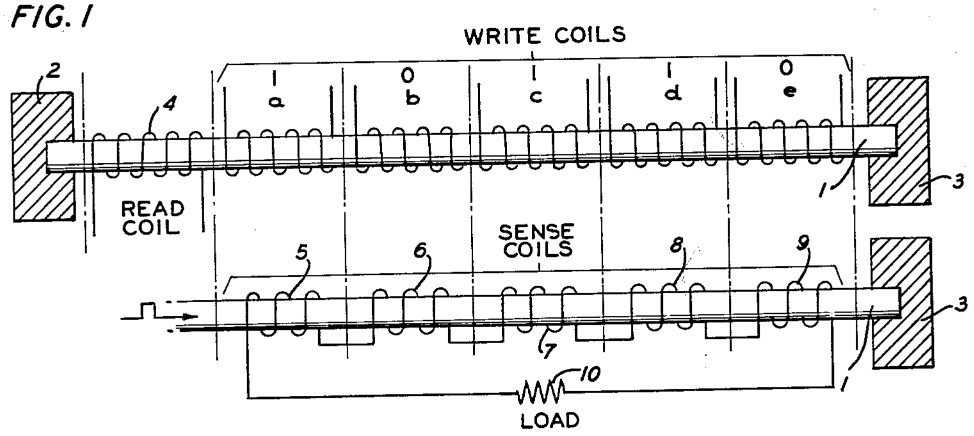
FIG. 2
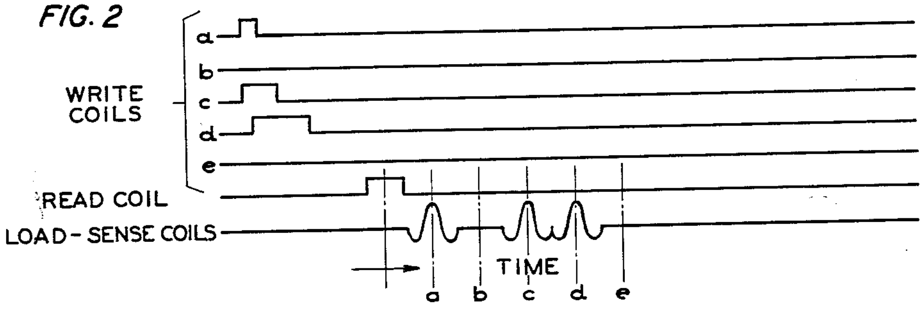
FIG. 3
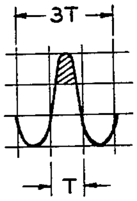
FIG. 4
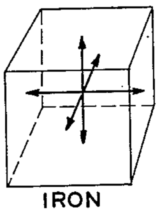
FIG. 5
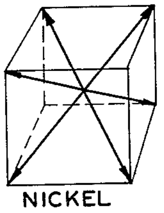
FIG. 6
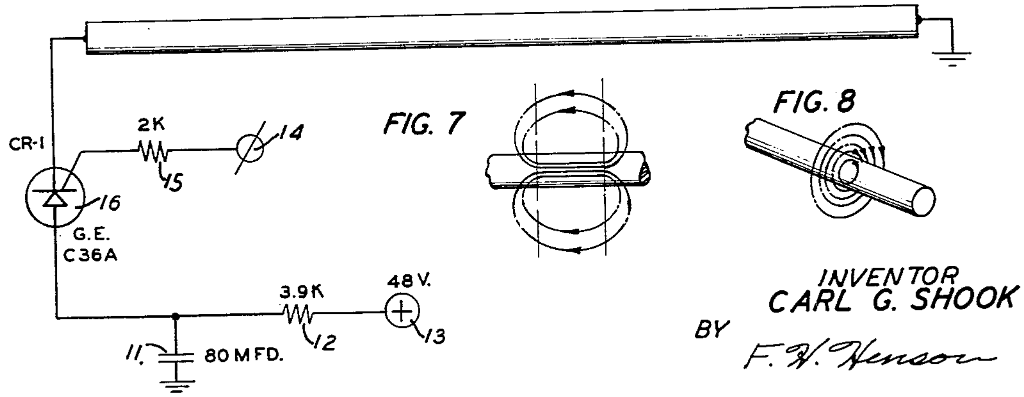
FIG. 7, FIG. 8
INVENTOR
CARL G. SHOOK
BY F. W. Henson
ATTORNEY 3,154,767
Patented Oct. 27, 1964

3,154,767

STORAGE WIRE ERASE

Carl G. Shook, Rochester, N.Y., assignor to General Dynamics Corporation, Rochester, N.Y., a corporation of Delaware Filed Feb. 8, 1960, Ser. No. 7,292
5 Claims. (Cl. 340—174)

This invention relates to the storage of information in a medium having relatively high remanance ferromagnetic hysteresis characteristics and particularly to means for erasing from such a medium the remanence of information previously stored therein for the purpose of readying such medium for reuse.

An object of the invention is to provide means whereby a medium having relatively high remanance ferromagnetic hysteresis characteristics may be employed to record and to store binary digital information either in the form of a spot exhibiting a magnetic reaction representing the binary digit 1 or in the form of a spot exhibiting no magnetic reaction representing the binary digit 0.

As an aid to understanding the arrangement and construction of the device of the present invention, reference is made to Patent 2,736,881, issued February 28, 1956, to A. D. Booth. It is known that it is difficult to change the state of a magnetized material as a result of which, heretofore, polarity has been used to differentiate between the two states used to represent the two binary digits. However, circuitry could be much simpler if the state of being magnetized could be used to represent one digit and the state of being not magnetized could be used to represent the other digit.

In accordance with the present invention, a rearrangement of the means heretofore employed, as by way of example in the Booth patent, is provided whereby the magnetic state of an element is made to exhibit a reaction to represent one binary digit and not to exhibit a reaction to represent the other binary digit. Stated otherwise, when the state of an element is explored, the presence of magnetization is used to represent one binary digit and the absence of magnetization is used to represent the other binary digit. Stated otherwise, again, if magnetization is detected, such detection constitutes a signal representing one binary digit whereas the failure to detect magnetization constitutes a signal representing the other binary digit.

In accordance with the disclosure in the Booth patent, different sections of a rod or a wire responsive both to magnetostriction and to magnetization may be used as a means to store information. Booth stores both positive and negative effects and upon read out makes a record of both positive and negative reactions as a magnetostrictive pulse travels along the rod, which record is then processed by circuit means to appear as a time spaced succession of binary 1 signals, the intervening binary 0 signals being automatically eliminated. A new record may then be established along Booth's rod by simply overriding and overpowering the previous record, but in no case can either a negative or a positive record be eliminated.

Applicant, on the other hand, records in only a single direction and hence his established record contains a detectable magnetic state representing a digit 1 and the absence of a detectable magnetic state representing a digit 0.

In accordance with the present invention, applicant provides orientation means whereby the magnetization of an element may be changed in direction so that such magetization may or, alternatively, may not be detected. The present invention, rather than providing means to change the state of such an element to a state in which there is the total absence of magnetization, provides means to change the state of such an element to a state which will appear to be such a total absence of magnetization.

According to domain theory of magnetization, the magnetic fields of atoms within small volumes of the material lie parallel. These small volumes, which are always magnetized to saturation, are called domains. However, the magnetic field of each domain in a cubic crystal must lie parallel to one of six directions within the crystal and these six directions within the cubic crystal are not always the same for different materials. In a previously unmagnetized material, the domains will be randomly oriented along the six easy directions of magnetization so that the net magnetization is zero. As a small magnetic field is applied to the material, those domains originally magnetized in the general direction of the applied field grow at the expense of the less favorably oriented domains. As the field is further increased, the domains continue to grow until each crystal in the material is one large domain magnetized in the easy direction of magnetization most nearly coinciding with the applied field. As still larger fields are applied and the magnetization approaches saturation, the domains rotate so as to align their direction of magnetization with that of the applied field. It is during this rotation process that the contraction or expansion of the material known as magnetostriction takes place.

The Joule effect refers to the change in length aparallel to the direction of the magnetizing field and it is this effect that is used to produce the sonic wave described by Booth, which, traveling along the length of a rod or wire, produces a detectable electrical effect.

If the paramagnetic material is also ferromagnetic and has substantial hysteresis characteristics, once it has been subjected to a magnetic field, it is practically impossible to return it to the original random orientation configuration. However, the direction of the orientation can be changed and hence this capability has been employed in the so-called binaries or cores of square loop material.

In accordance with the present invention, where the mass of magnetizable material is in the shape of a rod or a wire the field established to constitute a record is the result of the energization of a coil wound about the rod or wire and is thus aligned along the longitudinal axis thereof. Such a field may be easily reversed but cannot be easily erased by any operation of the coil. However, if a direct current of sufficient intensity is transmitted over the rod or wire and along the longitudinal axis thereof, a circumferential field in a direction perpendicular to the normal axial directions will be established. Where the rod or wire is easily magnetized along any direction, the field is thus rotated from the normal axial direction to other directions in planes perpendicular thereto. Since the read out means are provided to be responsive to fields aligned in the axial directions this rotated field cannot be detected and hence the rotation of the field by the direct current is fully equivalent to total erasure of the record. Where the rod or wire is biased to have a preferred direction of magnetization, essentially eliminating all but two of the normal directions of easy magnetization, the two parallel to the axis thereof, then upon the relaxation of the direct current used to rotate the field and to set up a circumferential field, such circumferential field will constitute an unstable condition and the domains will return to one or the other of the two preferred directions. In the absence of a field having an axial component, the return to the two preferred directions will be random with the net result that the record stored has been eradicated.

A feature of the invention is the provision of means for erasing a record residing in remanent fields established along a conductor having ferromagnetic hysteresis characteristics and consisting of means to transmit a pulse of direct current of sufficient intensity to rotate said remanent fields to planes perpendicular to the longitudinal axis of the said conductor.

Other features will appear hereinafter.

The drawings consist of a single sheet having eight figures, as follows:

FIG. 1 is a schematic diagram showing how a rod exhibiting the properties of electrical conductivity, magnetostriction, and ferromagnetism may be mounted and provided with coils wound thereabouts to record information at various positions along its length, to produce a sonic pulse and to derive in an output circuit a succession of signals as the magnetostrictive sonic pulse travels from one end of the rod to the other;

FIG. 2 is a nest of graphs showing how the separate write coils and the single read coil may be pulsed and the result obtained in the sense coils as the magnetostrictive sonic pulse caused by the pulsing of the read coil moves along the said rod;

FIG. 3 is an enlarged diagram of a single pulse induced in the output circuit as the magnetostrictive sonic pulse passes one locality of the rod which has been pulsed by a write coil so that a remanent magnetic record established thereat will result in an output pulse;

FIG. 4 is a perspective diagram showing the six directions of easy magnetization in a single crystal of iron;

FIG. 5 is a similar perspective diagram showing the six directions of easy magnetization in a single crystal of nickel;

FIG. 6 is a schematic circuit diagram showing how a pulse of direct current may be transmitted over a rod and along the longitudinal axis thereof;

FIG. 7 is a fragmentary part of a rod showing how a short portion thereof will support a remanent field aligned along the longitudinal axis thereof; and FIG. 8 is a perspective view of a fragment of such a rod representing the alignment of the magnetic field as it is rotated by the pulse of direct current along its axis from a field as represented in FIG. 7 to a circumferential field in planes perpendicular to the said longitudinal axis of the rod.

FIG. 1 is a schematic representation of a rod of material about which a plurality of coils are wound. The rod 1, for convenience, shown twice, is electrically conductive, has magnetic hysteresis characteristics, and is magnetostrictive. It is mounted in terminal blocks 2 and 3 to dampen the sonic pulses generated and transmitted by the read coil 4. In order to avoid interference, in the drawings, between the write coils *a*, *b*, *c*, *d* and *e* and the sense coils 5, 6, 7, 8 and 9, they are shown separately though it will be understood that the sense coils are wound directly over the write coils and that this double showing of the rod 1 is for convenience only. In the upper part of FIG. 1 where the separate write coils *a* to *e* are shown, the binary digits 1 and 0 are shown to indicate, by way of example, that the binary number 10110 will be written therein. As indicated in FIG. 2, the coils *a*, *c* and *d* will be pulsed and, as further indicated in the graphs of this figure, the pulses may be transmitted at random times and may be of random length, providing they all are completed before the read coil 4 is pulsed.

After the binary number 10110 has been stored in the rod 1 by the write coils *a*, *c* and *d* (the binary digits 0 result from non energization of the coils *b* and *e*), the read coil is pulsed and this results in the transmission of a sonic pulse as indicated by the time scale in the read coil and sense coils graphs of FIG. 2. As this sonic pulse passes one of the sense coils where a remanent magnetic record has been established, a pulse such as shown in FIG. 3 will be induced in the sense coil (5, by way of example) as the sonic pulse passes from the position of origin within the read coil 4 toward the right. As this sonic pulse travels toward the right and is then absorbed or dissipated by the block 3, it will cause a reaction in the sense coils and in the single load coil 10, as shown in the lowermost graph of FIG. 2.

A paramagnetic single crystal material and particularly a ferromagnetic material, such as iron and such as nickel, is known to have what might be termed six directions of easy magnetization (shown in FIGS. 4 and 5) along which the domains in a previously unmagnetized material are aligned at random, the net result of which appears to be a zero magnetization. As the material is magnetized to and beyond saturation, the domains are aligned along a line determined by the orientation of the energizing coil, which may not be exactly along one of the directions of easy magnetization. Hence, the sonic wave, a pulse due to magnetostriction (the Joule effect) will give rise to inverse magnetostriction (the Villari effect) and will therefore induce a pulse in a sense coil.

Where the rod 1 is constructed of ferromagnetic material having a relatively high remanence hysteresis characteristic, it may be magnetized at given points in its length, as indicated in FIG. 7, that is, with the field along the longitudinal axis thereof and the remanent field substantially along such axis.

When it is wished to erase the record so made, a direct current may be transmitted along such rod by any convenient means, such, by way of example, as by the circuitry of FIG. 6. This consists of a condenser 11, which charges normally through the resistor 12, from a source of current 13. When it is desired to erase the record in the rod 1, a trigger pulse from the source 14, through the resistor 15, will enable the controlled rectifier 16 to cause the charge held by the condenser 11 to discharge along the rod 1 to a ground at the distant end thereof. The result of this heavy pulse of direct current is to rotate the field as represented in FIG. 7 to a circumferential field in planes perpendicular to the longitudinal axis of the rod, as indicated in FIG. 8. The remanent field left thereafter, substantially in such perpendicular planes cannot respond to the sonic pulse to induce a useful pulse in the load coil 10.

It is known that a rod or a wire having square loop hysteresis characteristics may be biased in accordance with the Villari effect (inverse magnetostriction) so that for all practical purposes there remain but two directions of easy magnetization, those pointing in opposite directions along the longitudinal axis thereof. A binary "1" will be represented by one of these directions and a binary "0" by the other. A binary "1" will be stored in response to a signal of one polarity being applied to a write coil and a binary "0" will be stored in response to a signal of opposite polarity being applied thereto. If such a biased rod or wire is used, erasure will take place after the passing of the heavy pulse of direct current because the circumferential field caused by the pulse of direct current will collapse and the domains will return to one or the other of the two preferred directions. However, in the absence of a field having an axial component, the return of the domains to the two directions will be random with the net result that the storage will be eradicated.

What is claimed is:

1. A storage device comprising a ferromagnetic rod having relatively high remanence hysteresis characteristics in both a direction axially aligned with said rod and in a direction circumferentially aligned with said rod, first means in cooperative relationship with said rod operated to selectively produce a first remanent magnetization state of at least a segment of said rod which is axially aligned with said rod, and second means in cooperative relationship with said rod operated alternatively to the operation of said first means for producing a second remanent magnetization of said segment of said rod which is circumferentially aligned with said rod.

2. The device defined in claim 1, wherein said first means includes a write coil for storing information in said first remanent magnetization state, and said second means includes erase means for transmitting a strong pulse of direct current through the length of said rod to produce said second remanent magnetization state when said stored information is to be erased.

3. The device defined in claim 2, wherein said device includes third means for transmitting a sonic pulse down the length of said rod and detecting said first remanent magnetization state in response thereto to provide non-destructive readout of said stored information.

4. The device defined in claim 2, wherein said erase means includes a capacitance, means for charging said capacitance, a normally closed gate, means for serially connecting said capacitance, said gate and said rod, and means for opening said gate in response to a pulse applied thereto.

5. A storage device comprising a ferromagnetic rod having square loop hysteresis characteristics when biased, first means for biasing said rod to have solely two directions of easy magnetization respectively oppositely aligned along the axis of said rod, second means in cooperative relationship with said rod operated to selectively produce a first remanent magnetization state of at least a segment of said rod which is aligned with one of said two directions or a second remanent magnetization state of said segment of said rod which is aligned with the other of said two directions, and third means in cooperative relationship with said rod operated alternatively to the operation of said second means to erase said first and second remanent magnetization states, said third means including fourth means to transmit over said rod a pulse of direct current of sufficient intensity to temporarily produce circumferential magnetic fields about said rod, said circumferential fields being of sufficient intensity to overcome said first and second remanent magnetization states.

References Cited in the file of this patent

UNITED STATES PATENTS

| | | |
|---|---|---|
| 2,683,856 | Kornei | July 13, 1954 |
| 2,736,881 | Booth | Feb. 28, 1956 |
| 2,790,160 | Millership | Apr. 23, 1957 |
| 2,920,317 | Mallery | Jan. 5, 1960 |
| 2,945,217 | Fisher et al. | July 12, 1960 |
| 2,982,947 | Kilburn et al. | May 2, 1961 |
| 3,016,524 | Edmunds | Jan. 9, 1962 |
| 3,069,661 | Gianola | Dec. 18, 1962 |

OTHER REFERENCES

Communications and Electronics for January 1954, pp. 822–830, "Nondestructive Sensing of Magnetic Cores," by A. D. Buck and W. I. Frank (31).